United States Patent [19] [11] 3,928,749

Herrmann [45] Dec. 23, 1975

[54] MACHINE FOR AUTOMATIC PRODUCTION OF SEMI-CONDUCTOR COMPONENTS

[76] Inventor: Eggert Herrmann, Waldpromenade 86, 8035 Gauting, Germany

[22] Filed: Oct. 9, 1974

[21] Appl. No.: 513,263

[30] Foreign Application Priority Data

Oct. 17, 1973 Germany ............................ 2352113

[52] U.S. Cl. ...................... 228/4.5; 29/569; 29/589; 228/7; 228/49

[51] Int. Cl.$^2$ ............................................ B23K 1/00

[58] Field of Search ........ 29/569, 589; 228/4.5, 4.1, 228/7, 49

[56] References Cited

UNITED STATES PATENTS

| | | | |
|---|---|---|---|
| 3,226,810 | 1/1966 | Beliveau | 29/569 |
| 3,541,675 | 11/1970 | Pennings | 29/569 |
| 3,773,240 | 11/1973 | Heim | 228/4.5 |

*Primary Examiner*—Carl E. Hall
*Attorney, Agent, or Firm*—Burgess Ryan and Wayne

[57] ABSTRACT

Apparatus for connecting wires to selected points on a semi-conductor crystal and to a leadframe is provided in which a working head, which is vertically adjustable, is used for applying the wires to the crystal and to the leadframe. The working head is movable in accordance with the movement of two separate devices to automatically reorient the working head to several different positions as required by the number and locations of connections to be made. Both devices are program controlled. In addition, a crystal adjusting device is provided for angularly positioning the crystal with respect to the means for moving the working head.

28 Claims, 10 Drawing Figures

MACHINE FOR AUTOMATIC PRODUCTION OF SEMI-CONDUCTOR COMPONENTS

This invention relates to a machine for the automatic production of semi-conductor components, and more particularly for attaching connecting wires at the connection positions of a semi-conductor crystal and the leadframe carrying the crystal.

The apparatus according to the instant invention comprises a vertically adjustable working head which is provided with means for applying connecting wires to the crystal and the leadframe, a first program-controlled drive device for the moving of the working head to the working points on the crystal, a second program-controlled drive device for moving the working head to the working points on the leadframe, and a crystal adjusting device for setting the relative lateral position between the first drive device and the crystal.

German Patent (Offenlegungsschrift) No. 2,114,496 describes a machine for attaching connecting wires at the terminal positions of a semi-conductor component and to the housing accepting the semi-conductor component. In the German patent, a wire guide is disclosed which can be adjusted vertically with respect to the semi-conductor component and the housing through which the connecting wire is fed. A carrier is also shown which can be moved parallel to the plane of the semi-conductor component in two dimensions. The carrier carries either the housing with the semi-conductor component or the wire guide. The machine disclosed in the German patent is further characterized by a program carrier which can be advanced in steps to subsequently follow detent positions. The program carrier carries guide parts which cooperate with a complementary guide part on an entraining means connected with the adjustable carrier.

The guide parts are so arranged that in each detent position one guide part of the program carrier is spaced from a stationary reference point by a distance which has a certain relationship to the distance of a terminal position from a reference point on the housing of the semi-conductor component. The program carriers in the case of this machine are rigid perforated discs, which are machined in the guide parts in the form of conical openings. These program discs form, together with a respective stepping mechanism, the drive device for the movement of the working head (wire guide) to the working points on the crystal or, respectively, for the drive device for the movement of the working head to the working points of the leadframe (housing). The setting of a reference point on the semi-conductor component (crystal) to the starting point of the drive device for the movement of the wire guide to the working points on the crystal is carried out by mounting the semi-conductor component with the housing on a cross table so that the two points are made to coincide. After this adjustment the program for the working points on the semi-conductor component and the program for the working points on the housing is carried out automatically.

The main disadvantage of the above described machine is to be found in the use of program discs in order to move the wire guide in accordance with the preset program. A particular program disc can only be used for a single predetermined type of semi-conductor component. This means that for each different semi-conductor component which is to be processed on the machine, i.e., one requiring connections at different points, and also for slightly modified versions of one type of semi-conductor component, it is necessary to prepare a special program disc. This is not only tedious, but very expensive. The use of the program discs in the drive devices makes it difficult if not impossible to adjust the angular position or set of the semi-conductor component with reference to the course of movement as determined by the program circuit. Since the possibility for the setting of the angular position between the semi-conductor component and the drive device disclosed in the German patent does not exist, there is either a large percentage of rejects, or a comparatively expensive device is needed in order to align the crystal with respect to the leadframe or housing before connections are made. If angular alignment of the crystal and leadframe is not first carried out, the number of rejects becomes prohibitive. This is so since large semi-conductor components (with a diameter of approximately 2mm) cannot be processed with an angular error in alignment in excess of approximately half a degree, and small semi-conductor components (with a diameter of approximately 1mm) cannot be processed with an angular error in alignment of more than 1°.

Finally, there is also a disadvantage as regards using program discs in the drive devices owing to the fact that the program discs represent a comparatively large mass which must be moved by the pneumatic servo-motors. This is quite disadvantageous as it tends to greatly reduce the speed of operation of the machine.

The present invention is intended to provide an improved machine of the above described type, which is particularly suitable for operating in a larger range of angular error in alignment between the crystal and the leadframe without the need to offset the error through the use of complex corrective means.

The machine in accordance with the invention is characterized in that a leadframe adjusting device is provided for setting relative angular position between the first drive device and the crystal, and between the second drive device and the leadframe. Further, the program control for the drive devices is provided with numerical control means with fixed value memories which can be reprogrammed. Since in the case of the machine in accordance with the invention the program control is provided separately from the drive devices, it is possible in an advantageous manner to provide a leadframe adjusting device within the machine itself without excessive constructional complexity.

It is an advantage to provide the first drive device with two stepping motors which, in accordance with the associated program of the control means, drive the movable part of a cross table. The movable part of the cross table is coupled during the working phases in which connections are made between the wire and the crystal with the working head. Preferably the movable part of the cross table is coupled to the working head by a pivoting arm having a guide part which is fixed. The guide part fits into a corresponding guide on the working head on pivoting movement of the pivoting arm to couple the working head to the cross table. In accordance with one aspect of the invention, the guide part may be a cone and the guide is a conical opening. Owing to this construction of the drive device there is the particularly advantageous possibility of converting the program information of the program control means into mechanical movement of the working head without the necessity of including the program control means as a part of the working head itself. Furthermore it is advantageous that the movements of the working head owing to the step motor drive and the small mass to be moved (the pivot arm) can be carried out rapidly and exactly for example in the range of 0.5 sec for one working movement. For similar reasons it is preferred that the second drive device to have two stepping motors, which in accordance with the relevant program of the numerical control means, drives the movable part of a second cross table. The movable part of the second cross table is coupled with the working head in selected working phases preferably different from the working phases in which the first cross table is coupled to the working head, in which connections between the wire and the leadframe are to be produced. For coupling the movable part of the second cross table with the working head, a second pivoting arm is mechanically coupled with a second guide part which, on pivoting of the pivoting arm fits in a corresponding second guide on the working head. The second guide part is similar to the first in construction in that the guide part is preferably a cone and the guide is a conical opening. Since the second drive device with the exception of a modification to be mentioned below, is constructed like the first drive device, substantially the same advantages are achieved.

In the case of the second drive device, mechanical coupling is preferably provided between the movable part of the second cross table and the pivoting arm. This mechanical coupling includes a third cross table having a movable part which carries the pivoting arm and which is connected to the movable part of the second cross table in a rigid manner. This construction permits reducing the size of the pivoting section of the pivoting arm provided in the second drive device to one just as small as the pivoting arm provided in the first drive device. Without the interposition of the third cross table it would be necessary for the pivoting arm provided in the second drive device, for constructional reasons which are described below in conjunction with the leadframe adjusting device, to be made larger than the pivoting arm provided in the first drive device. The use of a larger pivoting arm could, however, have an effect on the speed of operation of the machine, due to increased mass. Although it is not essential to provide the third cross table or to reduce the effectiveness of the second pivoting arm, it should nevertheless be understood that it is the preferred embodiment.

In order to carry out the program control movement in a horizontal plane the working head is preferably arranged on a carrier plate which is part of a fourth horizontal cross table. The carrier plate contains guides which respectively contain conical openings. In order to be able to lower the working head onto the crystal and the leadframe respectively and to be able to raise it therefrom, a vertical guide is provided between the carrier plate and the working head, preferably a longitudinal guide with ball bearings.

In one preferred embodiment a cam control is provided for pivoting the pivoting arms and for carrying out the upward and downward movement of the working head.

The cam control is connected to first pivotally journalled double arm levers, each of whose ends on one side thereof cooperate with a respective cam disc which is in turn driven by a motor, while the other ends of the double arm levers control the operational movement of each of the pivoting arms described above. Preferably the pivoting arms are controlled by the double arm levers such that the guide parts are raised out of the guides when the pivoting arms are lifted and in that the pivoting arms are urged by springs in the opposite direction, i.e., into engagement with the guides. The pivoting arms are alternately operated by the double arm levers so that coupling between a respective drive device and the working head is produced and then discontinued in accordance with the movement of the cam control means. Due to alternate coupling of the first and second drive devices with the working head in which one drive device is coupled and the other is not, it is possible to utilize the servo motors of the uncoupled drive device to approach the next working point on the leadframe or crystal, as the case may be. In this manner, quite a bit of time can be saved and the speed of the lead connecting operation can be increased.

Preferably set screws are provided between the double arm levers and the pivoting arms for raising or lowering the pivoting arms to control their degree of movement. The pivoting arms preferably should be carried to a position by the double arm levers sufficiently to assure that the guide part, when out of its associated guide, is just sufficient to clear the guide. The height to which the lever is raised depends to a certain extent on the crystal or leadframe type which is being processed. By using the set screws it is possible to vary the degree of lift of the double arm levers to allow the apparatus to be efficiently used with many types and sizes of leadframes and crystals.

For best results, the cam control means comprises two second pivotally mounted double arm levers. One end of each lever is arranged to cooperate with a respective cam disc driven by the motor, while the other end of each double arm lever controls the upward and downward movement respectively of the working head. Preferably, a set screw is provided between the ends of the double arm lever for raising the working head and an abutment of the working head.

Between the end of the double arm lever for holding down the working head and one abutment of the working head, with which this double arm lever cooperates, a spring is provided which, on the production of a connection between the wire and the leadframe, effectively adds weight to the working head. In the case of production of a connection between the wire and the crystal, substantially only the weight of the working head is effective. This embodiment therefore has the advantage that in accordance with the different mechanical load carrying capacity of the leadframe and of the crystal, the connections can be produced through the use of different pressures approximately selected for the job at hand. The particular pressures to be used for a selected crystal and/or leadframe are well known to those skilled in the art.

In a preferred embodiment of the apparatus in accordance with the invention, a crystal adjustment device is provided for adjusting the reference zero point of the program controlled course of movement of the first drive device towards a defined reference point of the crystal. The crystal adjusting device comprises a fifth cross table having a movable part which can be displaced and also fixed in a selected position by means of a manipulator. The stepping motor of the first drive device is also preferably carried by this fifth table. If the crystal is laterally offset with respect to the zero point, a corresponding corrective bias or setting is made at the stepping motors of the first drive device. There is no need to move the crystal during this operation. Quite clearly by utilizing a crystal adjusting device of the type described it is possible to provide for such adjustment directly on the apparatus itself without the need to resort to expensive external devices.

For fixing the movable part of the fifth cross table after setting the crystal adjusting device a holding magnet may be provided which cooperates with a brake located at the mechanical connection between the fifth cross table and the manipulator.

In accordance with a further advantageous form of the invention, the leadframe adjusting device for setting the angular position of the crystal in such a manner that the reference axes of the crystal coincide with the directions of movement of the stepping motors of the first drive device and for setting the second drive device to the desired angular position, comprises a rotary table for the leadframe and crystal. This table is further provided with means for turning the second drive device through the same angle as the rotary table. The second drive device referred to herein is the second cross table described above and its associated stepping motors.

Use of the crystal adjusting device and the leadframe adjusting device therefore ensures that the programs to be used for connecting leads to the working points on the crystal and the leadframe for a selected type of semi-conductor component are always proper and coordinated with the selected component. Then connections can be made without corrections for lateral offset or different angular positions between the crystal and the leadframe.

In accordance with a preferred embodiment of the leadframe adjusting device, a lever plate is mounted on the rotary table and connected with the manipulator by a linkage. The lever plate is fixedly mounted on a rotatable column which carries the second drive device. The effective lengths of the lever arms which are a part of the linkage connected to the lever plate and the lever attached to the rotatable column are the same. It is thus possible to ensure that the second drive device, which is responsible for controlling the working points of the leadframe, is turned as well through the same angle as is the leadframe on the rotary table.

For fixing the leadframe adjusting device after the corresponding adjusting operation a holding magnet is preferably provided which cooperates with a brake attached at the mechanical connection between the second cross table and the manipulator.

The linkage between the manipulator and the lever plate preferably comprises a lever on the manipulator and a rod which is pivotally mounted on the lever plate. The linkage between the lever plate and the lever attached to the rotatable column comprises a rod which is pivotally attached at both its ends to the lever plate and the lever, respectively.

The manipulator for the crystal adjusting device and the manipulator for the leadframe adjusting device may be advantageously combined to form a single manipulator for controlling both crystal and leadframe adjustment. This single manipulator preferably has a rod which can be moved to various positions and is mounted for pivoting motion at the end opposite a handle to be used by the machine operator for moving the manipulator. Between the ends of the rod, the lever for the connection with the lever plate is mounted in a non-rotatable manner and one end of a guide rod is mounted in a rotatable and pivoting manner. The guide rod is connected in a non-rotatable manner via a guide column with the movable part of the fifth cross table. It is thus possible in a simple manner to operate the crystal adjusting means and the leadframe adjusting means from one manipulator.

Preferably the program control means has a code pin board which comprises information as regards the step number and direction of rotation of each of the stepping motors. This code pin board is interrogated by pulses which are produced by a program shaft whereby the coded information carried by the code pin board is fed into the system for use in controlling the stepping motors of the first and second drive devices. The pin board can have a wiring matrix made up of codable switch bodies and in which a fixed program can be set by the insertion of program pins or plugs. Such coding pin boards are particularly suitable for numerical controls because they are simple to handle, are well constructed and can easily be reprogrammed. When changing the program for example when a working point on a crystal is to be shifted, it is only necessary to exchange the switch bodies for new switch bodies containing the new step numbers needed to control the stepping motors. This permits simple changing to the new working point. The working point following the new working point in the program can also be changed as can all others as will become clearer in the detailed description of one of the preferred embodiments of the invention.

The program pins or plugs of a fixed program can be contained on a memory foil, and the program can be removed and replaced as a whole instead of by changing individual plugs. With such memory foils programmed by the program pins it is possible to build up a number of fixed value programs, and each program corresponds to a certain type of semi-conductor element or component. By simple replacement of the memory foils the machine can be reprogrammed to suit a different type of semi-conductor element or component. This programming system is, as can readily be appreciated, substantially easier to handle and more capable of variation than the program device in accordance with the above mentioned conventional machine (German Patent No. 2,114,696).

Preferably the program shaft carries operating cams, which on rotation of the program shaft cooperate with proximity switches whose signals are converted by an electronic pulse generator into pulses which pick up, interrogate, the coding pin board to bring about further switching to control movement of the various parts of the apparatus. Furthermore, the program shaft can be used for control of further electronic devices of the machine if desired. Preferably the program shaft is driven by a stepping motor which also serves for driving the cam control. In this manner it is possible to ensure precise synchronization between the program of the numerical control and the control of further electrical devices of the machine, for example the holding magnets in the adjusting devices and the cam control for the coupling of the drive devices with the working head. Of course the movement of the working head can also be controlled via the program shaft through interlocking mechanical and/or electronic controls.

An embodiment of the invention will now be described with reference to the accompanying drawings FIG. 1 shows a partly diagrammatic side view of the machine in accordance with the invention, in which some parts have been omitted for simplicity.

As shown in FIGS. 1–4, the machine in accordance with the invention comprises a base plate G and an assembly plate M. Assembly plate M is carried on columns S which are in turn mounted on the base plate G. On the assembly plate, a first drive device consisting of the stepping motors 2, 4 (FIGS. 1 and 2) and the first cross table 6, 8 are mounted. The stepping motors 2, 4 have their cylindrical axes mutually perpendicular to each other and drive the movable part 8 of the first cross table in directions which are mutually perpendicular, while portion 6 of the cross table is fixedly mounted on the assembly plate. The connection of stepping motors 2, 4 to movable part 8 is most clearly shown in FIG. 3.

Figure 1:
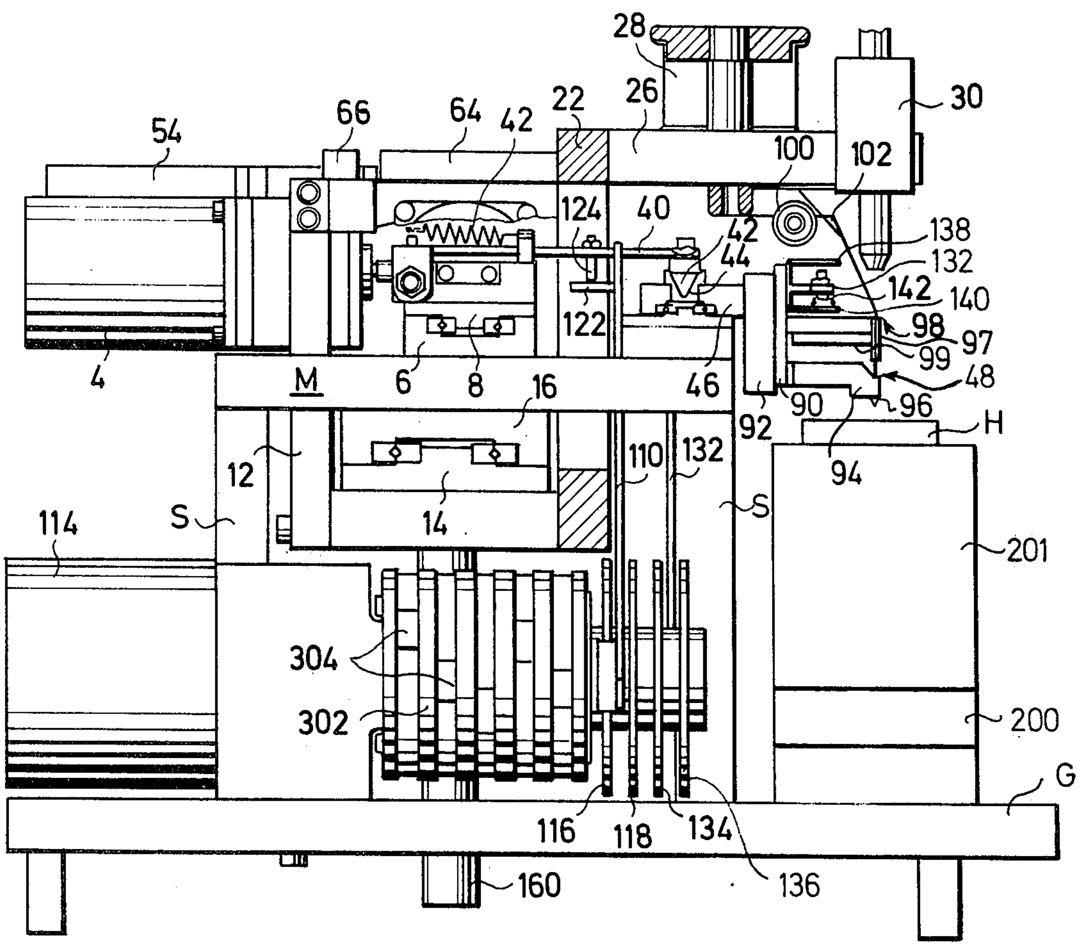
Figure 2:
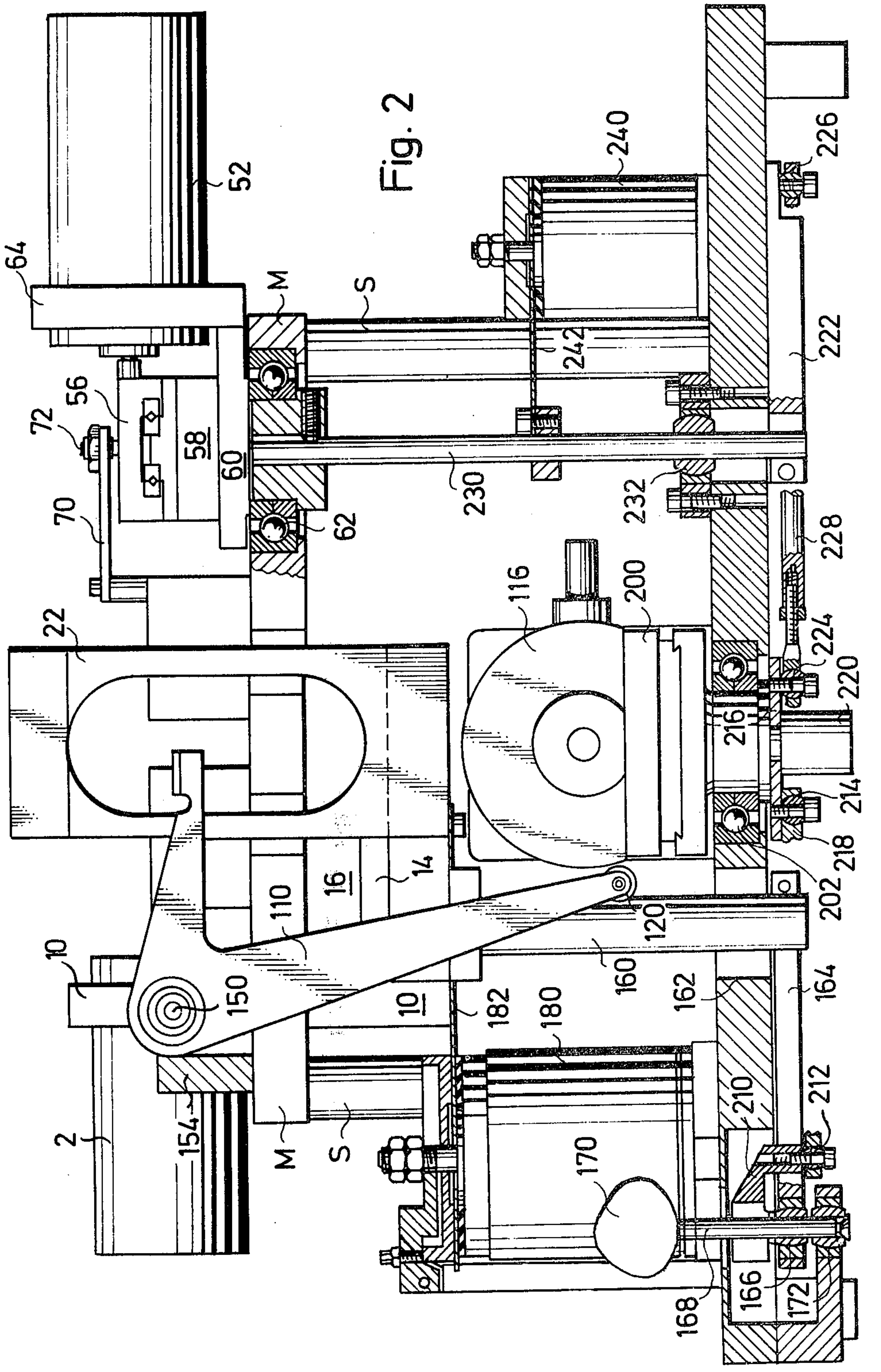
FIG. 2 shows a partly diagrammatic front view of the machine in accordance with the invention in a partly disassembled condition.

The stepping motors 2, 4 are mounted on vertical plates 10 and 12 respectively, which are in turn mounted on the movable part 14 of another cross table (FIGS. 1 and 2). The fixed part 16 of this second cross table is mounted on the lower side of the assembly plate M. The plates 10, 12 fit through openings 18 and 20 (FIG. 3) respectively, in the assembly plate M. The actuation of the cross tables 14, 16 will be described below in conjunction with the crystal adjusting device.

A plate 22 is mounted on the movable part 14 (FIG. 3) which extends through a recess 24 in the assembly plate M. A horizontal carrier 26 (FIG. 1) is mounted on plate 22 and carries a coil 28 which in turn carries the gold wire to be used for connections. The carrier 26 also carries an image point projecting device. Only the projector head 30 of the image point projecting device is shown. The light source in the projector head has been omitted for purposes of simplification. The projector head 30 is thus constrained to move with the movable part 14 of the cross table 14, 16.

On the movable part 8 of the cross table 6, 8 there is arranged a pivoting arm 40 which can be pivoted about the horizontal axis of the apparatus. Between the pivoting arm 40 and the movable part 8 an extension spring 42 is provided, which presses the outer end of the pivoting arm 40 (on the right in FIG. 1) in a downward direction. On the outer end of the pivoting arm 40 there is attached a guide cone 42 which tapers downwards at an acute angle. The cone 43 fits into a corresponding conical guide 44. Conical opening 44 lies in plate 46 which is the movable part of still another cross table 46, 47. The fixed part 47 of the cross table 46, 47 is the working head of the apparatus and is connected to the assembly plate M. The guide cone 42 and the conical hole 44 form a guide and coupling device between the movable part 8 of the cross table 6, 8 and the working head 48, which is mounted on the plate 46 via plate 92. Working head 48 is basically comprised of parts 94, 96, 97, 98 and 99 and is mounted to movable plate 46 via plates 90 and 92 as will be more fully described below.

Figure 3:
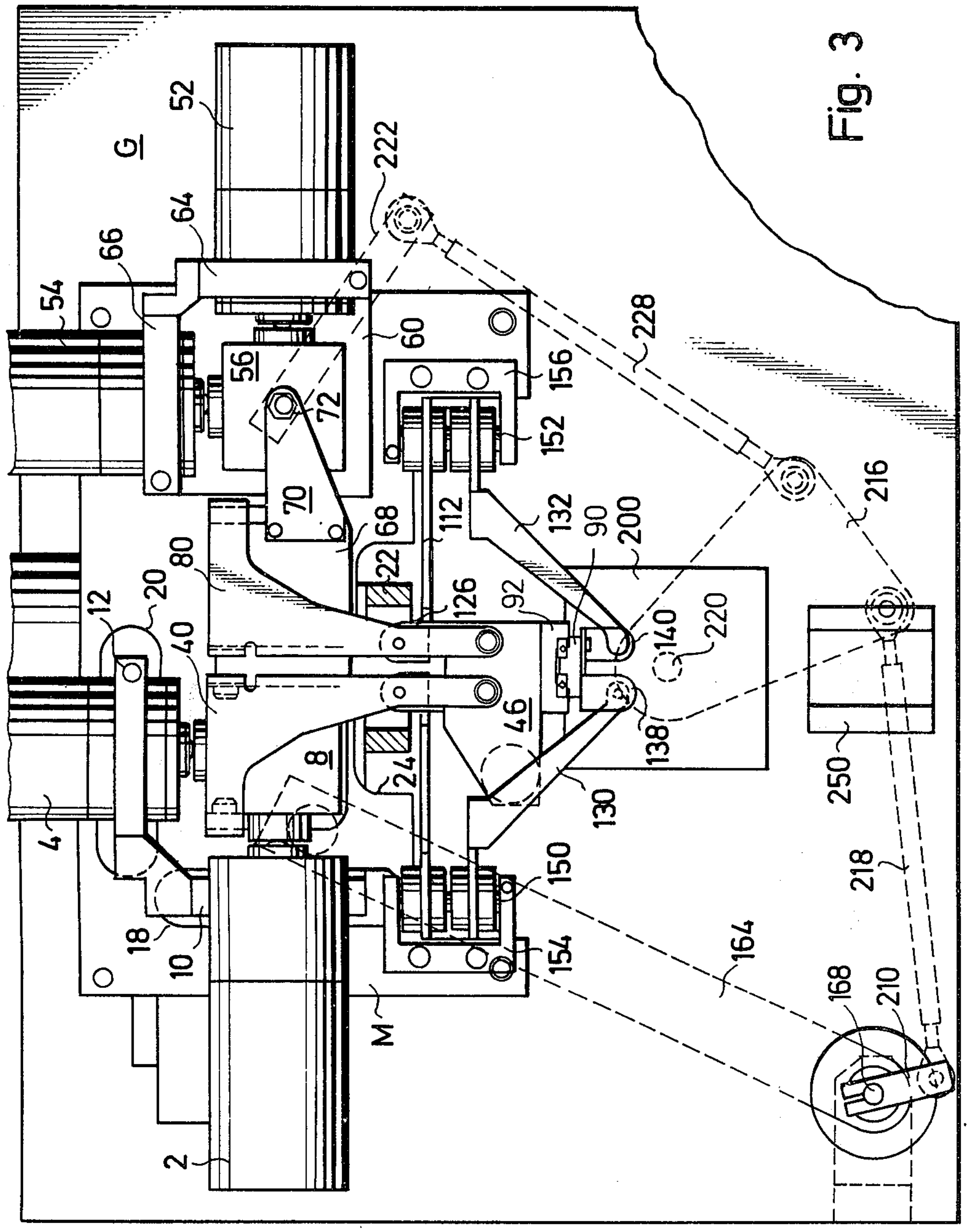
FIG. 3 shows a plan view of the machine in accordance with the invention.

The assembly plate M furthermore carries a second drive device consisting of the stepping motors 52, 54 (FIG. 3) and a fourth cross table 56, 58 (FIGS. 2 and 3). The movable part 56 of the cross table 56, 58 can be driven in mutually perpendicular directions by the stepping motors 52, 54. The fixed part 58 of the cross table 56, 58 is fixed on the plate 60, which is mounted in a rotatable manner in the assembly plate M by means of a ballbearing 62. The plate 60 carries the stepping motors 52, 54 respectively via vertical plates 64, 66. Thus, the whole second drive device is rotatably mounted in the ball-bearing 62.

The coupling of the movement of cross tables 56, 58 with the working head 48 is carried out via a further cross table 68, which is diagrammatically shown in FIG. 2. The movable part of the cross table 68 is connected via a connecting link 70 with the movable part 56 of the cross table 56, 58. The connecting part 70 is rigidly connected with the movable part of the cross table 68 and is connected via a central conventional pivot pin 72 with the movable part 56.

The cross table 68 carries a second pivoting arm 80 (FIG. 3), which is constructed like the pivoting arm 40 and is so urged by an extension spring (not shown) that its front end (lower end in FIG. 3) is moved into a position in which the guide cone attached to the pivoting arm 80 is pressed into a mating conical hole in the plate 46. Since the arrangement of the guide cone on the pivot arm 80 and the associated conical hole in the plate 46 is the same as in the arrangement in the case of the lever 40 it has been omitted from the drawings for simplicity.

The working head 48 as defined above, has a vertical frame plate 90 (FIG. 1), which is guided via a longitudinal guide means with ball-bearings on a plate 92 parallel to it (FIG. 3), which in turn is connected to the carrier plate 46. Mounted on the frame plate 90 is a wire guide 94 with capillary tubes 96 and a gripping device 98, which can be actuated by a holding magnet 99 for holding the gold or aluminum thread. Furthermore, the working head 48 has a conventional pivoting burner mounted thereon (not shown) with a hydrogen flame in order to flame off the wire after the production of a connection between a working point on the crystal and the leadframe as will be more fully explained hereinafter. The gold wire is guided from the coil or bobbin 28 via a guide wheel 100 and a rocker 102 to the gripping device 98. The working head 48 described here fixes the gold thread on the terminal points on the crystal and the leadframe by welding with thermocompression. It is, however, to be taken into account that other working heads could be provided as well, for example a working head for attaching the thread ultrasonically. Working head 48 is movable in the vertical direction as will be more fully described below.

The gripping device 98 comprises a pair of tongues 97 which are closed by magnet 99 to grip the wire passing therethrough. The tongues 97 are opened by a conventional spring (not shown) upon release of the magnetic force to permit the further threading of wire therethrough.

After a bond to the leadframe has been made, the gripping device is moved, preferably upwardly by means to be described below, to break the wire.

The pivoting of the pivoting arms 40, 80 and the performance of the upward and downward working movement of the working head 48 is controlled by a cam control or drive means. The cam control means comprises two first pivotally mounted double arm levers 110, 112 (FIG. 3). One end of each lever 110, 112 cooperates with a cam disc 116, 118, respectively. Contact with the cam disc is made through a roller 120 in the case of lever 110 (roller not shown for lever 112). The other end of each of the double arm levers control respectively the working movement of each of the pivoting arms 40, 80 as seen most clearly in FIG. 3. In FIG. 2, one double arm lever 110 is shown in plan view, the lever 112 being behind it as more clearly seen in FIG. 3.

The cam discs are driven by a stepping motor 114 which controls movement of levers 110, 112. In FIG. 1, the double arm lever 110 is also shown.

A lateral projection 122 mounted on the upper end of the double arm lever 110 engages a set screw 124, which is screwed into the pivoting arm 40. The double arm lever 112 is similarly constructed and has a follower roller (not shown) engaging the cam disc 118 (FIG. 1), while its other end 126 (FIG. 3) also makes engagement via a set screw with the pivoting arm 80. As has already been mentioned, the pivoting arms 40, 80 are preloaded by a spring in such a manner that the guide parts on the pivoting arms are brought into engagement with the guides on the carrying or movable plate 46. The double arm levers 110, 112 engage the pivoting arms 40 and 80 respectively in such a manner that the guide parts are raised out of the guides over a portion of the cam cycle of the discs 116, 118 as will be more fully explained hereinafter.

Accordingly, there is alternate connection between the first drive device for the crystal or the second drive device for the leadframe with the working head 48.

The cam control means has two further pivotally mounted double arm levers 130, 132 (FIG. 3) having ends arranged to cooperate with cam discs 134 and 136 respectively which are in turn driven by the motor 114. The other ends of the double arm levers 130, 132 control the upward and downward movements respectively of the working head 48. The double arm lever 110 and the double arm lever 130, and also 112 and 132 are mounted on bushings 150 and 152 respectively, which are mounted by holding means 154 and 156 respectively on the assembly plate M. Between the ends of the double arm lever 130 for raising the working head 48 and an abutment 138 on the working head 48 is a set screw (not shown) with whose help the maximum lift of the working head can be set. Between the end of the double arm lever 132 for pressing down the working head 48 and an abutment 140 of the working head, with which this double arm lever 132 cooperates, a spring 142 (FIG. 1) is inserted, which, when a connection between the wire and the leadframe is produced to effectively increase the weight of the working head 48. The bracket 138 is most clearly seen in FIGS. 1 and 3. Lever 130 acts on the underside of the bracket for raising the working head 48 while lever 132 acts by applying downward force to the bracket to lower the working head 48.

It is desirable for the attachment of the wire on the crystal by means of thermo compression to take place with less force than the attachment of the wire on the leadframe. The force on the application of the wire to the leadframe is determined by the weight of the working head 48 plus the force of the spring 142. The force with which the connection between the wire and the crystal is produced can be adjusted by setting the distance or space between the end of the lever 132 and the abutment 140 at the lowest point of the working movement to the double arm lever 132. If this distance is so selected that the spring practically does not exert any force downwards, only the weight of the working head 48 is effective. If this distance is greater so that the spring exerts a force upwards, the resulting force is less than the force exerted by the weight of the working head 48. In this manner the working pressure in the case of the production of the connection between the wire and the crystal can be adjusted by a suitable shaping of the cam disc 136 so as to achieve a desired force value.

Figure 4:
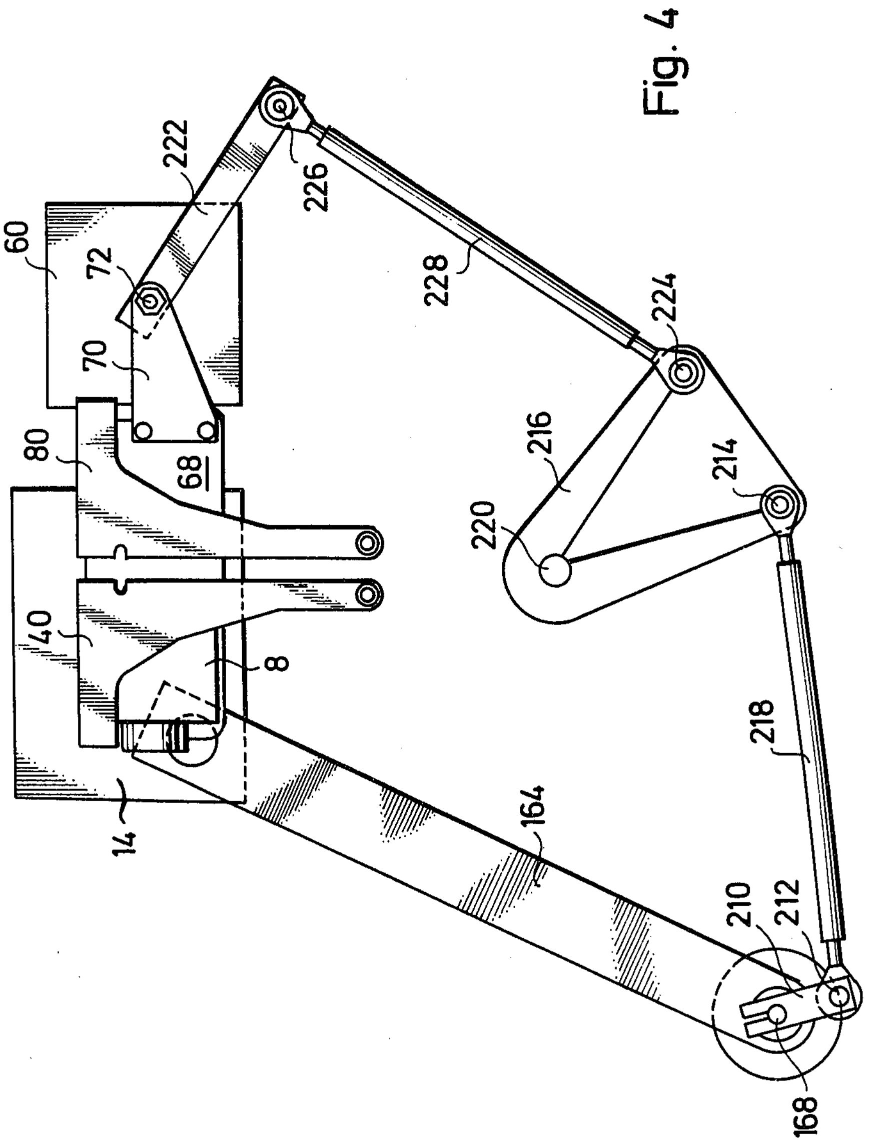
FIGS. 4 and 4A show a plan view of the main parts of the crystal adjusting device and the leadframe adjusting device.
Figure 4A:
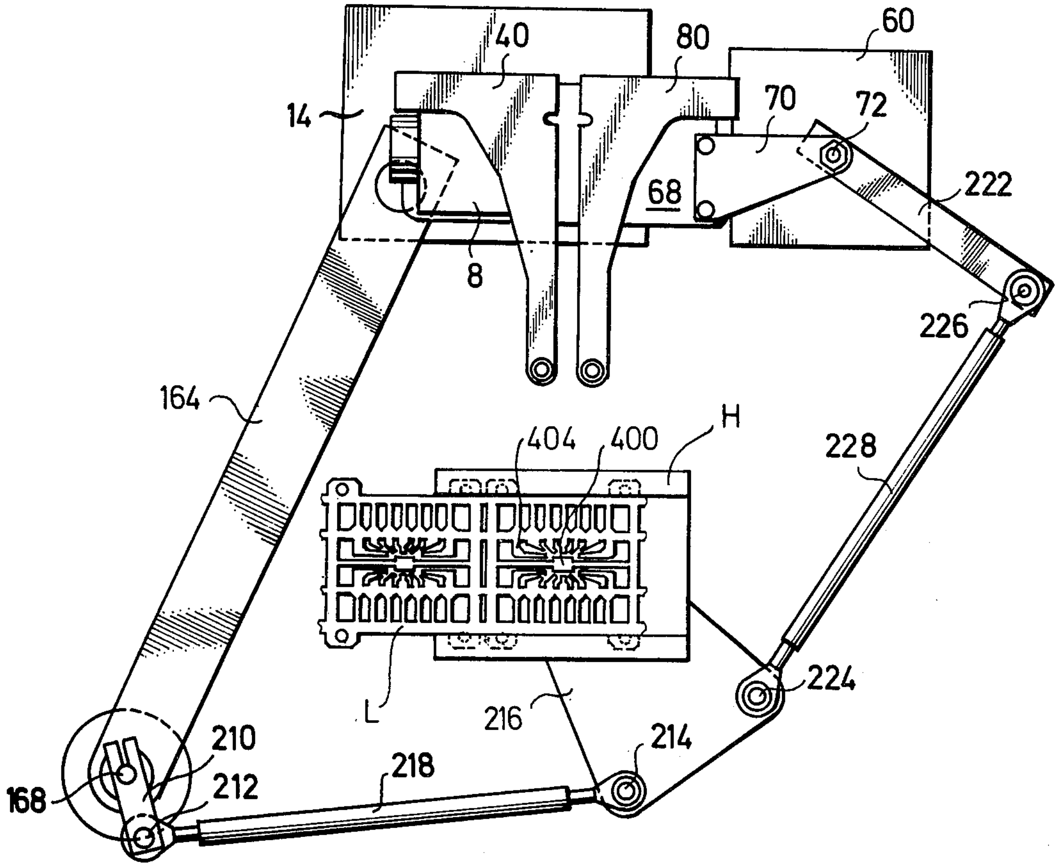
Figure 4B:
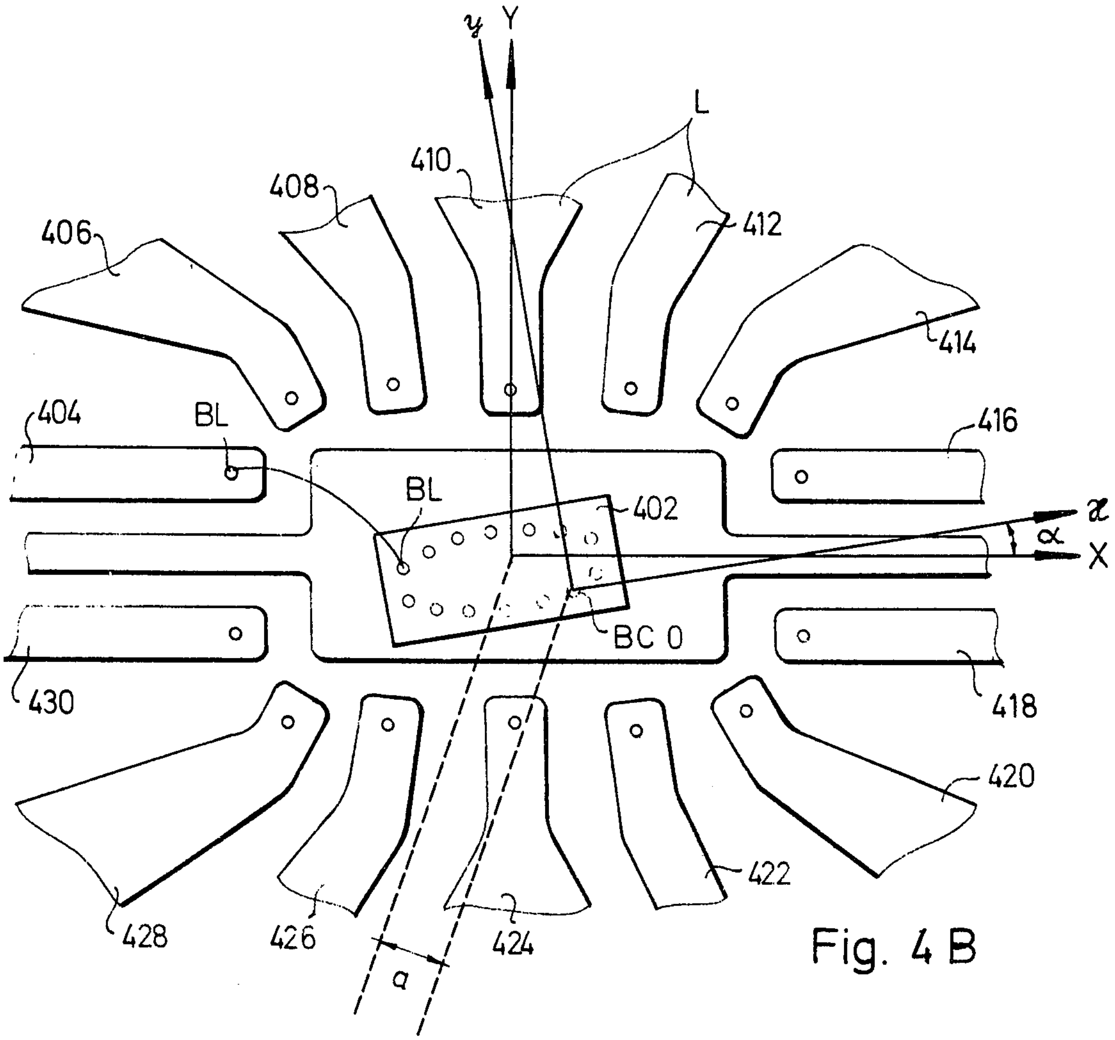
FIG. 4B shows the lead frame and crystal.

FIGS. 1, 4A and 4B show schematically the leadframe and crystal in relation to the working head 48. Referring to FIG. 1, H denotes a leadframe holding means of conventional type mounted on a conventional supporting structure 201 and 200. Supporting structure 201 may be an indexing device used to convey a leadframe both to and away from working position. FIGS. 4A and 4B, which will be described in greater detail, show the leadframe and crystal, greatly magnified, in position to be worked on by working head 48. The supporting structure 201 has been omitted for clarity.

Numeral 400 designates the central portion of the leadframe in which the semiconductor chip or crystal 402 (FIG. 4B) is carried. FIG. 4B represents an exploded view of this central section of the leadframe and crystal. Lugs 404 to 430 are also part of the exploded leadframe. BL denotes a bond point on the leadframe and BC denotes a bond point on the crystal, which are to be interconnected by goldwire. One such connection is shown between lug 404 and the crystal.

The raising and lowering of the working head 48, and the movement of the working head in the coordinate system fixed by the movements of the various cross tables, is used to reorient the working head to the various positions indicated in FIG. 4B to complete connections between leadframe 400 and crystal 402.

The position of crystal 402 on the leadframe 400 may vary to a considerable degree. For optimum results in the automatic processing of integrated chips, provision should be made for adjusting the movement of the working head to the particular angular alignment of the crystal and/or leadframe and for adjusting the alignment of the crystal and/or leadframe with respect to the apparatus.

In FIG. 4B, the position of the crystal 402 is defined by an X-Y coordinate system which is centered and aligned along the symmetrical axis of the plate 400, and by a second set of X-Y coordinate axes (designated by script letters *x-y*), which are associated with the crystal 402 and which are parallel to two adjoining sides of the crystal. The position of the crystal in relative terms, is then defined by the angles the two separate coordinate systems make with each other and by the lateral distance by which the two systems are separated. When the bonding procedures is to be carried out, this misalignment must be taken into account.

The crystal adjusting device for setting the reference zero point of the program controlled movement of the first drive device (stepping motors 2, 4 and cross table 6, 8) to a defined reference point on the crystal comprises, as already mentioned, the cross table 14, 16. The movable part 14 of the cross table is connected to a guide column 160 (FIG. 2) which passes through a hole 162 with suitable clearance through the base plate G. A guide rod 164 is non-rotatably mounted to the guide column at the lower end thereof and this rod is connected via a ball-joint 166 in a rotatable and pivoting manner with the rod 168 of a manipulator 170. The rod 168 of the manipulator is journalled on the end, remote from the handle, in a ball-joint 172 in a rotatable and pivoting manner. By tilting the manipulator 170 it is therefore possible to displace the guide column 160 and table 14, 16 sideways or laterally with respect to its longitudinal axis until the reference point on the crystal coincides with the reference zero point of the programmed movement of the first drive device. The adjustment movement can be followed with the light points, produced by the projector 30, on the crystal. The light point impinges on that point of the crystal, which corresponds to the zero position of the capillary tubes 96 of the working head such as the point BCO in FIG. 4B. In order to ensure that the working head 48 does not obstruct the projection of the light point, during actuation of the crystal adjusting device the working head 48 is withdrawn with the help of the stepping motor 4 out of the ray path of the light point to the left (direction of viewing as in FIG. 1). After the end of adjustment, the working head 48 is moved back into its resting position.

In order to fix the crystal adjusting device or the movable part 14 respectively of the cross table 14, 16 after the end of adjustment, a holding magnet 180 is provided, which cooperates with a braking part 182 attached to the guide column 160, the braking part being for example a metal strip.

For adjusting the angular position of the crystal in such a manner that the reference axes of the crystal coincide with the directions of movement of the stepping motors 2, 4 and for adjusting the rotary or rotational position of the second drive device (stepping motors 52, 54 and the cross tables 56, 58) to the proper angular position, of the leadframe, a rotary table 200 (FIG. 2) is provided. The table 200 carries the holding means for the leadframe provided with the crystal and is journalled in a ball-bearing 202. A mechanical connecting linkage is provided between the manipulator 170 and the rotary table 200 in the second drive device. This linkage turns the drive device through the same angular displacements with the rotary table. This linkage has a lever 210 (FIG. 3) which is attached to the manipulator in a non-rotary manner, and the lever 210 is connected via a rod 218, carried in ball-joints 212, 214 with a lever plate 216. The lever plate 216 is connected in a fixed manner with the rotary shaft 220 of the rotary table 200. With this part of the linkage, therefore, the rotary 200 can be turned until the crystal is in the correct angular position with respect to the first drive device. The linkage furthermore has a rod 228 which is fixed on the lever plate 216 and on a lever 222 by ball-joints 224 and 226 respectively. The lever 222 is for its part connected in a non-rotatable manner with a rotatable comumn 230, which at its lower end (FIG. 2) is journalled in a ball-joint 232 and at its other end is connected with the plate 60. In order for the second drive device to be turned as well through the same angular displacements as the rotary table 200, the effective lengths of the lever arms at the lever plate 216 and the lever 222 are of the same size. For fixing the rotatable column 230 (that is to say for clamping the leadframe adjusting device) a holding magnet 240 is provided, which cooperates with a braking part 242 fixed to the rotary column 230, for example in the form of a sheet metal strip. On the rotary table 200 the holding means (not shown) is mounted, which carries the leadframe with the crystal. The working range of the machine on the crystal and on the leadframe can be observed in a conventional manner in a stereo microscope, of which in FIG. 3, only the mounting socket is shown at 250.

The numerical program control means comprises as its main part a coding pin board 300 (FIGS. 5a and 6) which comprises information as regards the stepping numbers and the direction of rotation of each of the stepping motors 2, 4 and 52, 54 (FIG. 3). The coding pin board 300 is interrogated by pulses, which are initiated by a program shaft 302 (FIG. 1). The program shaft 302 is shown diagrammatically in FIG. 5b and in side view in FIG. 1. The program shaft 302 has cam pieces 304 (FIG. 1), which on rotation of the program shaft cooperate with proximity switches NS1 to NS5 (FIGS. 1 and 5b), whose signals are converted in an electronic pulse generator 306 into pulses which cause switching on further interrogation of the coding pin-board 300. Furthermore pulse generator 306 can be used for the control of further electronic devices of the machine, for example of the holding magnet 308 for the gold thread clamping device; the rotary magnet 310 for the movement of the hydrogen flame, etc. As can be seen in FIG. 1, the program shaft 302 is mounted on the drive shaft of the stepping motor 114, which also serves for driving the cam control means 110, 112, 116, 118, 130, 132, 134 and 136.

Figure 5A:
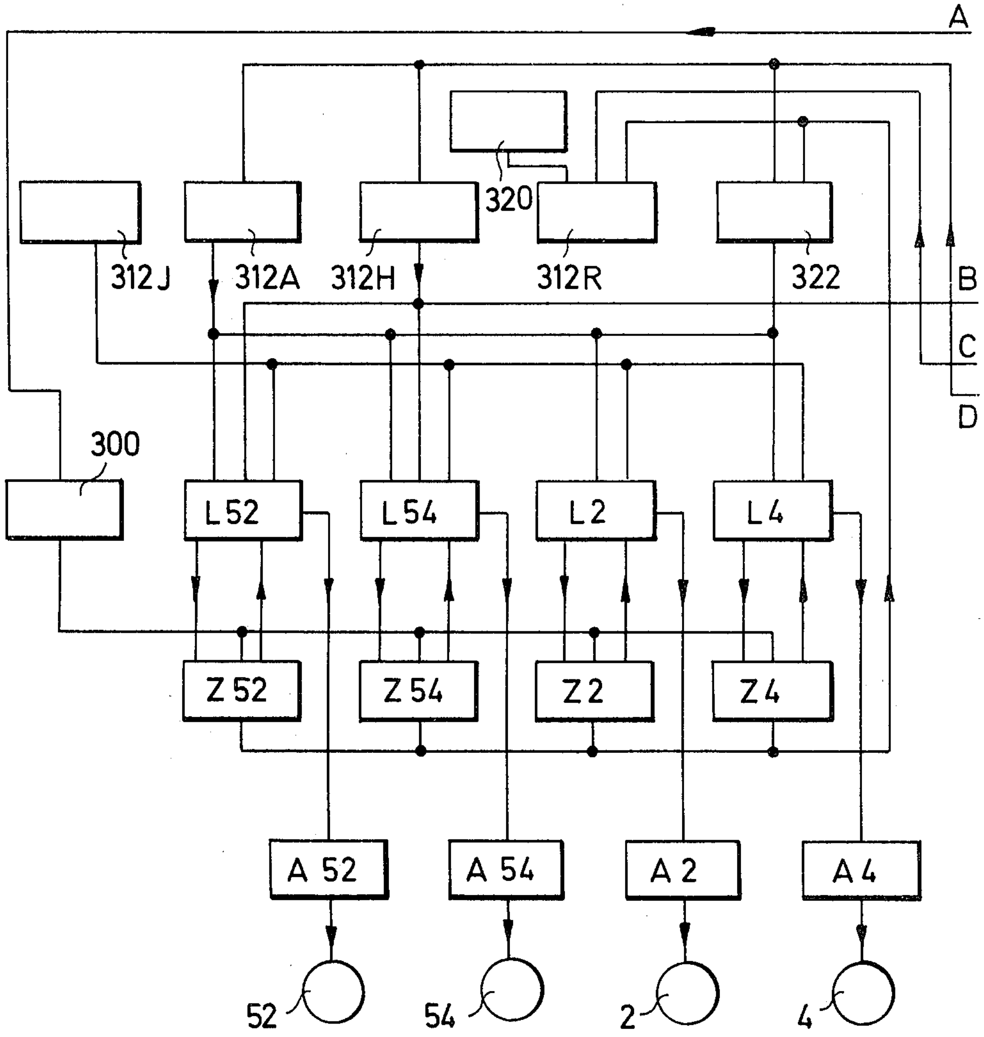
FIGS. 5A and 5B show block circuit diagrams of the numerical control for the device in accordance with the invention, in the case of which the figures adjoin each other at the points A, B, C and D.
Figure 5B:
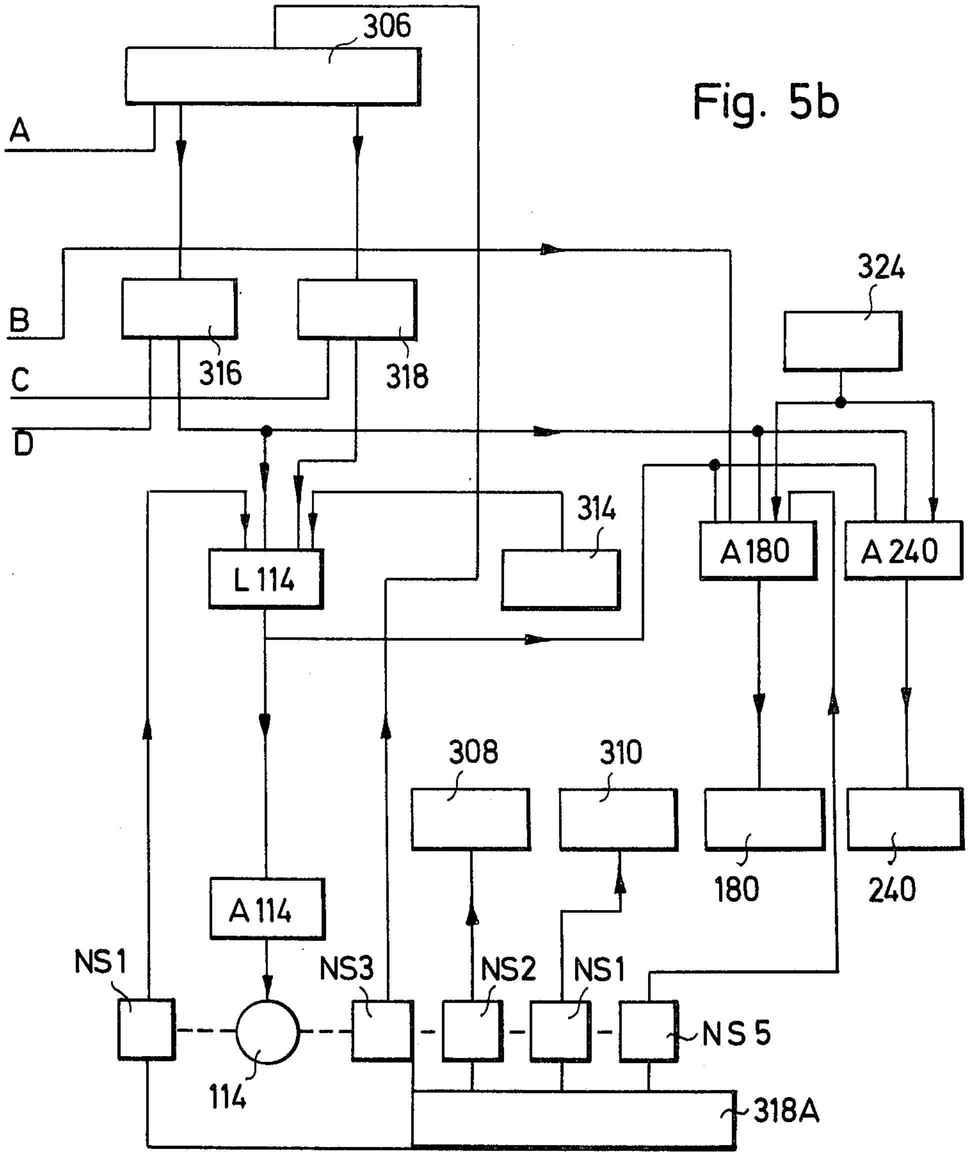

In what follows with reference to FIGS. 5a and 5b, which are to be put together to form a single figure at the joints A, B, C and D, the modes of operation of the machine in accordance with the invention will be explained. In the case of the "automatic" mode of operation, an operational mode selection switch 312 A-H-J-R is brought into the position 312A. By actuation of the starting key 314, the two holding magnets 180 and 240 attract and lock the crystal adjusting device and the leadframe adjusting device respectively and remain in this condition until the starting key or button 314 is released. By actuation of the starting key 314 furthermore, via the logic circuit L114 and the drive unit A114, the stepping motor 114 is started and therefore the program shaft 302 is turned. On turning of the program shaft 302, the proximity switch NS3 feeds the signal to the electronic pulse generator 306, which controls the interrogation column by column of the coding pin board 300. The information is supplied to the counters Z52, Z54, Z2 and Z4, each respectively coordinated with the stepping motors 52, 54, 2 and 4. In the "automatic" mode of operation the logic circuits L52, L54, L2 and L4 respectively provide signals for the control units A52, A54, A2 and A4 respectively, of the stepping motors, which represent the stepping numbers, stored in the coded pin board 300, and directions of rotation for the corresponding motors. The time sequence of the adjustment of the individual stepping motors is so determined with the cam control, for example 110, 112 and 130, 132 that the stepping motors 2, 4 for the first drive device (crystal) are actuated, while a connection is produced between the wire and the leadframe and vice versa. After the performance of a number of working operations which can be set by means of a decade switch 316 and which is in accordance with the total number of the connections to be produced on the crystal and the leadframe, the stepping motors 2, 4, 52 and 54 are automatically turned back into a starting position defined by limit switches. The holding magnets 180, 240 are released via an associated drive unit A180, A240 and the drive of the program shaft 302 is interrupted. Besides the determination or matching of the operating movements of the stepping motors in accordance with the cam control, the remaining functions are controlled in one working operation of the machine by the program shaft 302. One revolution of the program shaft 302 corresponds to one working operation, which comprises working steps in accordance with the following example:

Step A — Via the proximity switch NS1, the rotary magnet 310 is switched for the pivoting of the holder with the hydrogen flame, which flames off the gold wire after completion of two connections on the crystal and on the leadframe.

Step B — Via the proximity switch NS2, the holding magnet 308 in the gold thread clamping device is switched so that the thread is not drawn off of the capillary tube 96 during the breaking and flaming off respectively;

Step C — The proximity switch NS3 issues, as already mentioned, the starting command for the stepping motors 2, 4, 52, 54;

Step D — The proximity switch NS4 gives the stopping command for the program shaft via the logic circuit L114. The proximity switch NS4 can, however, also be used to report the end of the working operation at the decade switch 316;

Step E — The proximity switch NS5 provides a "semi-automatic" mode of operation which will be described below, after reproduction of a connection between the wire and the leadframe the holding magnet 180 for the crystal adjusting device. The proximity switches are connected with a feedback device 318 linked with the program shaft 302, and the feedback device can be provided with an indicating device (not shown) in order to indicate the respective working operation which has been performed.

In the semi-automatic mode of operation, the operational mode selection switch is brought into the position 312H. On actuation of the starting key 314, the two holding magnets 180 and 240 are energized. After termination of the production of the connection between the wire and the leadframe, the holding magnet 180 for the crystal adjusting device is de-energized via its associated proximity switch. After each completed working operation, the program shaft stops. The setting of the cross table of the first drive device, which is responsible for the working points on the crystal, is then carried out manually. As can be seen from the block circuit diagram of FIG. 5*a*, the logic circuits L2 and L4 are not put into operation, because at their third input they do not receive any signal via the operational mode selection switch 312 as is the case with the "automatic" operational mode.

A further mode of operation is the "repeating" of a working operation, that is to say the renewed production of a wire connection between the crystal and the leadframe. This mode of operation is started by actuating the starting key 314. As is the case with the automatic mode of operation the holding magnets 180 and 240 are energized for the amount of time key 314 is active. Then via a decade switch 318, the desired working operation is selected from the series which is necessary for the production of the semi-conductor component following which the stepping motors 2, 4, 52, 54 run up to the preselected working operation without movement of the program shaft 302. Then the connection to be repeated is carried out by actuation of the repeat key 320 in conjunction with the setting of the position 312R as the operational modes selection circuit 312. After termination of the operating step, the machine is automatically stopped. By actuation of the "index" key 322 the stepping motors are brought back into their starting position.

Finally there is also the possibility of a "setting up" mode of operation in the case of which departures between the calculated program in the coding pinboard and the actual working points on the crystal and the leadframe respectively can be experimentally determined and evened out. The setting up mode of operation is set by switching over the operational mode selection switch 312 into the position 312J. The holding magnets 180 and 240 are not energized in this mode of operation, but they can be locked by the magnet key 324. After switching over into the operational mode previously called setting up, each one of the four stepping motors 2, 4, 52, 54 for the cross tables can be individually controlled forwards and backwards at creep speed via a corresponding conventional key or two conventional coordinate toggle switches (neither shown). The number of steps necessary in the setting up mode and the direction of movement of the stepping motors can be evaluated for correction of the program.

Figure 6:
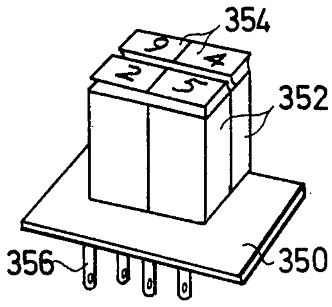
FIG. 6 shows a perspective view of a part of the coding pin board, which is used in the numerical control means of the instant invention.

FIG. 6 shows a part of a device, which is used in the case of the machine in accordance with the invention as a coding plug or pinboard. The coding pinboard 300 consists accordingly of a circuit plate or board 350, on which the codable switch bodies 352 are plugged. The switch bodies 352 are programmed by insertion of program plugs 354. In FIG. 6 for example, in the first column the numbers "9" and "2" are programmed and in the second column the numbers "4" and "5" are programmed. By changing over the program plugs 354 for other program plugs, the switch bodies can be reprogrammed as may be desired. The switch bodies 352 are connected with soldering lugs 356 via conductive tracks (not shown) and the lugs serve as input or output terminals for the wiring matrix. Such coding pinboards are known as such and are sold by the company Ghielmetti AG, for example, under the designation "Data-Modul-System."

Figure 7:
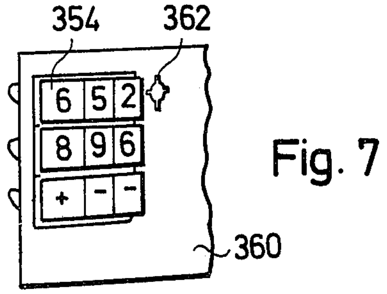
FIG. 7 shows a further view of a memory or recording foil with the switching bodies for control of the step number and the direction of movement of the stepping motors in the machine in accordance with the invention.

As is also known, the program plugs 354 can be plugged on as a fixed program contained on a memory foil 360, in the case of which the program as a whole can be removed and exchanged for another one. FIG. 7 shows a part of just such a memory or recording foil 360, which, in three columns per program plug for the step numbers in accordance with pins and ones carries the directions of movement to the stepping motors. The line length of such a program pinboard is determined in the present case in accordance with the number of necessary working operations. Since the program plugs 354 are plugged into corresponding openings, for example 362, the program can also be changed on a recording or memory foil and is then, however, available as a whole in order to adapt the machine in accordance with the invention for the working cycle in the case of a different semi-conductor component, for example, if the coding pinboard 300 is interrogated from left to right in FIG. 7, and assuming the first column of information is associated with motor 2 and the second with motor 4, then, upon starting the motor drive, motor 2 will move 68 steps forward from its reference zero point and motor 4 will move 59 steps backward from its reference zero point. The next two columns may contain information for driving motors 52 and 54 to move from the previous bond point to the next bond point. The operation is repeated as many times and for as many motors as needed to complete the bonding operation.

Although several preferred embodiments have been described above, it is to be understood that many modifications may be made by those skilled in the art. It is intended to cover all such modifications which fall within the spirit and scope of the invention as defined by the claims appended hereto.

What is claimed is:

1. A machine for automatically attaching connecting wires at selected connection positions of a semi-conductor crystal and leadframe comprising a vertically adjustable working head, and horizontally movable means on said working head for applying connecting wires to the crystal and the leadframe, a first program-controlled drive device for moving the working head to preselected working points on the crystal, a second program-controlled drive device for moving the working head to preselected working points on the leadframe; and a crystal adjusting device for adjusting the relative lateral position of said crystal between the first drive device and the crystal, a lead-frame adjusting device for setting relative angular position of said leadframe between the first drive device and the crystal and between the second drive device and the leadframe, and program control means controlling the said drive devices, said program control means having numerical control means with fixed value reprogrammable memories.

2. A machine according to claim 1, wherein the first drive device comprises two stepping motors connected to said program control means, a cross table having a movable part, said stepping motors being connected to the movable part of the cross table, and means for coupling the movable part to the working head during the working phases of said working head in the which connections are produced between the wire and the crystal.

3. A machine according to claim 2, wherein the means for coupling the movable part of the cross table to the working head comprises a pivotable arm having a guide part, said working head having a guide for accepting said guide part, said pivoting arm being pivotable between a first position in which said guide part is not connected with said guide and a second position in which said guide part is connected to said guide.

4. A machine according to claim 3, wherein the guide part is a cone and the guide is a conical opening.

5. A machine according to claim 1, wherein the second drive device comprises two stepping motors, a second cross table having a movable part, said stepping motors being connected for moving said movable part, means for coupling the movable part of the second cross table with the working head when connections between the wire and the leadframe are to be produced.

6. A machine in accordance with claim 5, wherein the means for coupling the movable part of the second cross table with the working head comprises a second pivotable arm, said pivoting arm being coupled to a second guide part, said working head having a second guide for accepting said second guide part, said pivoting arm being movable between a first position in which said second guide part is not connected to said second guide and another position in which said second guide part is connected to said second guide.

7. A machine according to claim 6, wherein the second guide part is a cone and the second guide is a conical opening.

8. A machine according to claim 6, wherein the means for coupling the movable part of the second cross table and the second pivoting arm comprises a third cross table, having a movable part which carries the second pivotable arm, said third cross table being connected to the movable part of the second cross table in a rigid manner.

9. A machine according to claim 1, wherein the working head is mounted on a carrier plate, a fourth horizontal cross table on which said carrier plate is mounted, said carrier plate having conical guides.

10. A machine according to claim 9, further comprising a vertical guide means mounted on said carrier plate and working head for vertically guiding movement of said working head with respect to said carrier plate, said vertical guide means comprising a longitudinal guide with ballbearings.

11. A machine according to claim 3, comprising a cam control means, said cam control means for controlling the said pivoting arms and for carrying out the upward and downward movement of the working head.

12. A machine according to claim 11, wherein the cam control means comprises two first pivotally journalled double arm levers, a plurality of cam discs and a motor for driving said cam discs, one end of each said double arm lever cooperating with another one of said cam discs, the other end of said double arm levers controlling the movement of said pivoting arms.

13. A machine according to claim 12 wherein the double arm levers are positioned under the pivoting arms for normally moving the pivoting arms out of engagement with the working head, and spring means for normally urging the pivoting arms into engagement with the said working head when the double arm levers release the said pivoting arms.

14. A machine according to claim 12 further comprising set screws mounted between the double arm levers and the pivoting arms for setting the height to which the pivoting arms are raised.

15. A machine according to claim 11, wherein the cam control means comprises two second pivotally mounted double arm levers, one end of each second double arm lever being arranged to cooperate with a second cam disc, said second cam disc being driven by a motor, the other end of each of the double arm levers control the upward and downward movement respectively of the working head.

16. A machine according to claim 15, further comprising abutment means mounted on said working head for engaging said second double arm levers, set screw means mounted between said second double arm levers and said abutment means.

17. A machine according to claim 16, further comprising spring means between the end of one of the double arm levers and said abutment means for holding down the working head, said spring means being effective on the production of a connection between the wire and the leadframe to add to the effective weight of the working head.

18. A machine according to claim 1, wherein the crystal adjusting device for adjusting the reference zero point of the program controlled course of movement of the first drive device towards a defined reference point of the crystal comprises a fifth cross table having a movable part which movable part can be displaced and fixed in a selected position, manipulator means for displacing said fifth table, said manipulator means and the stepping motors of the first drive device being carried by said fifth cross table.

19. A machine according to claim 18, further comprising magnet means and a brake for cooperating with said magnet means, said brake and magnet means forming a mechanical connection when activated between said fifth cross table and said manipulator to fix the position of the said fifth cross table.

20. A machine according to claim 1, characterized in that the leadframe adjusting device for setting the angular position of the crystal in such a manner that the reference axes of the crystal coincide with the directions of movement of the stepping motors of the first drive device and for setting the second drive device to the angular position, which is also turned on turning the crystal, of the leadframe comprises a rotary table for the leadframe provided with the crystal and means for turning the second drive device through the same angular amount as the said rotary table.

21. A machine according to claim 20 further comprising a second holding magnet and a second brake part for fixing the position of the leadframe adjusting device.

22. A machine according to claim 20 further comprising a lever plate fixedly mounted on the rotary table and connected to the manipulator by a first linkage, a second linkage and lever connected to said lever plate, rotary column, said lever being non-rotatably mounted on said column, said column carrying the second drive device, the effective lengths of the lever arms on the lever plate and the lever attached to the rotary column being equal in size.

23. A machine according to claim 22, wherein the linkage between the manipulator and the lever plate has a second lever mounted on the manipulator and a rod which is pivotally mounted on the lever plate.

24. A machine according to claim 22, wherein the linkage between the lever plate and the lever attached to the rotary column further comprises a rod.

25. A machine according to claim 18, wherein the manipulator for the crystal adjusting device and the manipulator for the leadframe adjusting device are combined to form a single manipulator.

26. A machine according to claim 25, wherein the manipulator has a handle on one end, the manipulator comprising a rod which can be turned at the end opposite to the handle, the rod being pivotally mounted, the lever for connection with the lever plate being mounted between the ends of the rod in a non-rotary manner, a guide rod mounted in a rotatable and pivoting manner, the guide rod being connected in a non-rotatable manner via the said guide column with the movable part of the fifth cross table.

27. A machine according to claim 1, further comprising a program shaft and operating cams carried on said program shaft, a plurality of proximity switches (NS1, NS2, . . . NS5), and an electronic pulse generator for converting signals from said proximity switches into pulses, a coding pin board, said pulses causing switching on interrogation of the coding pin board.

28. A machine according to claim 27, wherein the program shaft is driven by a stepping motor which stepping motor also drives the cam control.

* * * * *